June 19, 1934.  R. T. HOSKING  1,963,845
LOCK NUT AND METHOD OF MAKING SAME
Filed Sept. 8, 1931
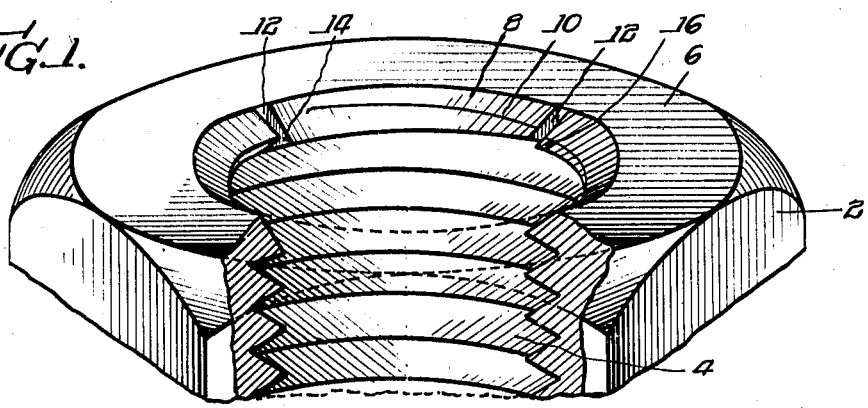
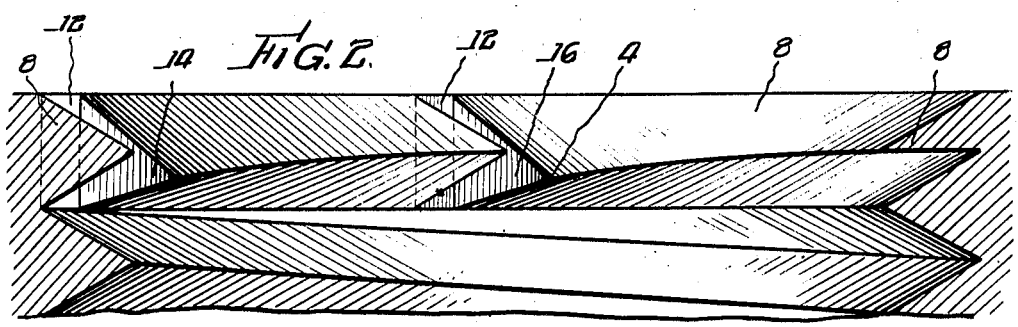
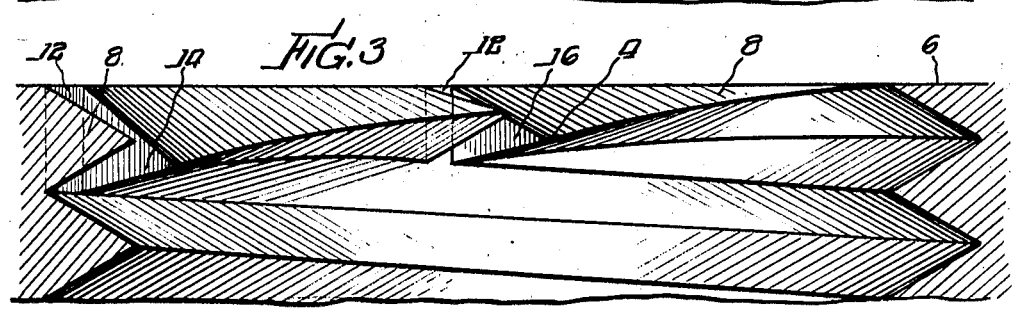
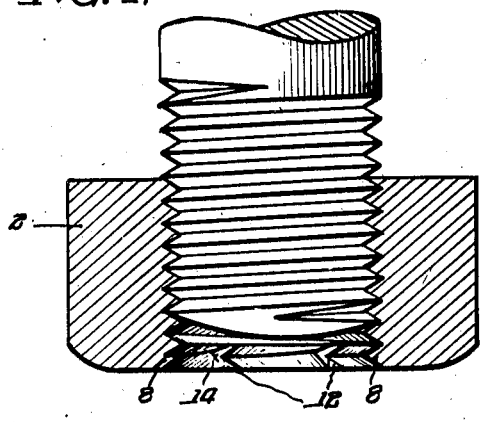
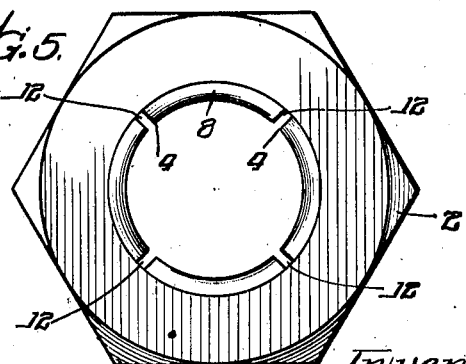
Inventor,
Richard T. Hosking,
By: Cheever, Cox & Moore
Attys.

Patented June 19, 1934

1,963,845

UNITED STATES PATENT OFFICE 1,963,845

LOCK NUT AND METHOD OF MAKING SAME

Richard T. Hosking, Chicago, Ill., assignor, by mesne assignments, to Illinois Tool Works, Chicago, Ill., a corporation of Illinois Application September 8, 1931, Serial No. 561,566

11 Claims. (Cl. 10—86)

My invention relates to lock nuts of the type wherein the nut or other threaded opening is provided with means integral therewith for effecting the locking action as distinguished from the type of lock nuts wherein a separate and independent member is adapted to cooperate with the threaded hole and the bolt for accomplishing the locking action.

In the present invention the term "lock nut" is used to cover a lock nut either of standard or special construction, and also any member having a threaded bore through which a bolt or other co-operative threaded member is adapted to screw.

One of the objects of my invention is to provide a lock nut wherein a portion of the threaded opening of the nut is formed with one or more projections or locking abutments.

Yet another object of my invention resides in the provision of a lock nut wherein that portion of the thread in the inner bore of the nut which is at the outer face of the nut is severed in one or more places to provide a corresponding number of thread sections and wherein a portion of one or more of the thread sections is deformed or warped laterally out of the true plane of the thread to provide locking projections.

Still another object of my invention resides in the provision of a lock nut wherein that portion of the spiral thread of the threaded bore of the nut which is at the outer face of the nut, is warped or deflected upon itself to provide a continuous circular, thread-like shoulder or projection and wherein this continuous thread-like shoulder is severed transversely at one or more points to provide a corresponding number of sections and certain and/or all of which sections are deformed in whole and/or in part to provide a plurality of thread gripping and locking projections.

Yet another object of my invention resides in a simple type of lock nut wherein the standard type of nut may be converted in a simple manner into a cheap and economically constructed lock nut.

Yet another object of my invention resides in the method of converting any type of threaded partition into a lock nut.

These and other objects of my invention will be apparent from a perusal of the accompanying drawing wherein Fig. 1 is a partly perspective and partly sectional view of one form of my improved lock nut;

Fig. 2 is a sectional view thereof;

Fig. 3 is a sectional view corresponding to Fig. 2 but showing the preferred form of my invention, i. e., as applied to a spiral thread instead of a full thread;

Fig. 4 is a sectional view of a lock nut embodying my principles as shown in position on a threaded bolt, and Fig. 5 is a top perspective view showing the manner in which the thread is slit and deformed.

Referring now to the drawing in detail, in the exemplification of my invention, Fig. 1 shows an ordinary type of nut 2 provided with a threaded bore 4, but as hereinbefore stated, my invention is equally applicable to any type of nut and/or to any type of member having a threaded opening. The invention itself is concerned with the transformation or alteration of that portion of the thread of the threaded bore or nut which is at the extreme outer face 6 of the nut. In general, my invention resides in cutting or slotting that portion of the thread of the nut which is at the outermost face in one or more places to provide a plurality of thread sections, and in warping portions of said sections out of the plane of the thread to provide a plurality of locking projections.

In the type of my invention shown in Figs. 1 and 2, that portion of the thread at the outermost face 6 is altered by warping portions thereof laterally into a common plane, whereby to form a continuous thread-like shoulder or abutment 8, or what might be termed a full, continuous thread. The line 10 illustrates the manner in which a portion of this thread is warped or deflected downwardly to provide this continuous thread-like abutment. Except for the alteration in the last turn of this spiral thread, the threaded bore of the nut is of standard construction, i. e., it may be any type of spiral thread.

My present invention contemplates providing this continuous thread-like shoulder or abutment 8 with one or more transverse slots or cuts 12 whereby to provide one or more, i. e., a corresponding number, of thread-like sections. Simultaneous with, or subsequent to, the cutting operation, I deflect or warp the rear or trailing end of each section, as shown at 14 and 16, to provide a plurality of locking points and edges which are adapted to grip the thread of the bolt at a plurality of places about its periphery whereby to prevent retrograde movement of the bolt relatively to the nut, or vice versa. In certain instances, in lieu of warping the trailing ends of each respective section, I may warp the entire section or alternate sections, or in certain instances I may warp one section in whole or in part relatively to another section or portion of a section whereby to accomplish the equivalent locking effect. It will be noted that in cross section, each of these sections is substantially triangular and that in deflecting them in whole or in part, as hereinbefore described, a very pronounced locking point or locking edge, or edges are provided for engaging the threaded portion of the bolt.

In Fig. 3 of the drawing I have shown my preferred construction which is a more simple type of my invention wherein the spiral thread of the nut or threaded bore at the outer face 6 of the nut is provided with one or more locking sections and then these separate sections are warped at their trailing or rear portions in the same manner as hereinbefore stated in connection with the description of the type shown in Figs. 1 and 2 so as to produce the locking projections. The difference between the types shown in Figs. 2 and 3 resides in the fact that in Fig. 2 the locking sections are formed from a full, continuous thread, whereas in Fig. 3 they are formed from spiral thread direct. In the type shown in Fig. 2 the bolt will thread through the lock nut from the inner side until the thread of the bolt reaches the continuous formation of the shoulder having the locking sections at which point the sections will grip the thread to prevent the bolt from being screwed in further into the thread, or inadvertently reversed. In the type shown in Fig. 3, the nut can be threaded completely into the bolt, the locking sections gripping with sufficient resiliency and at the same time rigidly enough to prevent a reversal of movement.

It will be apparent that by my improved method of forming a lock nut of the foregoing type or types, I have provided a very simple manner of converting standard nuts or members having standard spirally threaded openings into lock nuts. This is accomplished in the type shown in Fig. 3 simply by providing the requisite tool which will cut the outer turn of the thread into a plurality of sections, and at the same time force the trailing portion of each cut section or in lieu thereof, I may provide a tool for first cutting the section and yet another tool for deflecting the rear portion of the cut sections.

By the provision of this simple method I have consequently provided a very simple, economical and effective type of lock nut.

Having thus fully described my invention, what I claim as new and desire to obtain by Letters Patent of the United States is:

1. A lock nut comprising a relatively rigid body portion having a spirally threaded bore, the portion of said thread at the outer face of the body of the nut being formed into one or more substantially annular circumferentially extending sections having portions thereof deflected in the direction of the axis of the bore of the unit to provide thread gripping projections.

2. A lock nut having a spirally threaded bore, a spiral thread at the outer face of the nut terminating in a plurality of circumferentially extending sections having portions deflected laterally in the direction of the bore of the nut to form locking shoulders, said deflected portions being disposed at the trailing end of each section.

3. The herein described method of forming a lock nut which consists in severing that portion of the spiral thread of the nut which is adjacent the outer face of the nut at one or more places and deforming the severed thread to provide a substantially annularly arranged segmented bead, and in deflecting an end of one of the severed portions in a direction parallel with the bore of the nut to provide a locking shoulder.

4. The herein described method of forming a lock nut which consists in severing that portion of the spiral thread which is at the outer face of the nut at a plurality of spaced points circumferentially of the thread to form sections, and in deflecting the trailing portion of each section in a direction parallel with the bore of the nut whereby to form locking projections.

5. The herein described method of forming a lock nut which consists in cutting the outermost turn of the thread transversely and deflecting a portion of the thread adjacent the severance in the direction of the bore of the nut to provide a substantially annular segmented bead.

6. The herein described method of forming a lock nut which consists in deflecting the outermost portion of the spiral thread of the threaded bore of the nut into a continuous circular thread, slotting the circular thread at one or more points to form one or more annular sections, and deflecting at least a portion of one of said sections laterally.

7. The herein described method of forming a lock nut which consists in converting the outermost spiral turn of the thread into an annular turn by cutting the turn transversely at a plurality of points to provide a plurality of annularly arranged sections, and deflecting the trailing edge of each section.

8. The herein described method of forming a lock nut which consists in converting the outermost spiral turn of the thread into a continuous circumferential turn by cutting the turn transversely at a plurality of points to provide a plurality of annularly arranged sections, and deflecting the trailing edge of each section toward the inner face of the nut.

9. The herein described method of forming lock nuts which comprises converting the outermost turn of a spiral thread into a continuous thread, severing said continuous thread at a plurality of spaced-apart points circumferentially to provide a plurality of thread sections, and deflecting one or more of said threaded sections laterally in a direction parallel with the bore of the nut to provide a locking effect.

10. The herein described method of forming lock nuts which comprises converting the outermost turn of a spiral thread into a full annular thread, severing said thread at a plurality of spaced-apart points circumferentially to provide a plurality of thread sections, and deflecting alternate sections laterally to provide a locking effect.

11. A lock nut having substantially annularly arranged bead-forming means in its bore comprising a plurality of circularly extending sections, the trailing portions of said sections being deflected laterally in the direction of the bore of the nut to provide locking projections.

RICHARD T. HOSKING.